United States Patent
Fritze et al.

(10) Patent No.: US 7,736,504 B2
(45) Date of Patent: Jun. 15, 2010

(54) CROSSFLOW FILTRATION SYSTEM WITH QUICK DRY CHANGE ELEMENTS

(75) Inventors: Karl Fritze, Denmark Township, MN (US); Nathan E. Marks, Savage, MN (US)

(73) Assignee: 3M Innovative Proerties Company, St. Paul, MN (US)

( * ) Notice: Subject to any disclaimer, the term of this patent is extended or adjusted under 35 U.S.C. 154(b) by 59 days.

(21) Appl. No.: 12/135,875

(22) Filed: Jun. 9, 2008

(65) Prior Publication Data

US 2008/0237109 A1 Oct. 2, 2008

Related U.S. Application Data

(63) Continuation of application No. 10/838,140, filed on May 3, 2004, now abandoned.

(60) Provisional application No. 60/467,663, filed on May 2, 2003.

(51) Int. Cl.
*B01D 27/10* (2006.01)
(52) U.S. Cl. .................... 210/238; 210/321.6; 210/443; 210/450
(58) Field of Classification Search ................. 210/238, 210/321.6, 443, 450
See application file for complete search history.

(56) References Cited

U.S. PATENT DOCUMENTS

| | | |
|---|---|---|
| 3,504,796 A | 4/1970 | Bray |
| 3,746,640 A | 7/1973 | Bray |
| 3,762,430 A | 10/1973 | Maercklein |
| 3,831,757 A | 8/1974 | Gossett et al. |
| 3,887,463 A | 6/1975 | Bray |
| 4,077,883 A | 3/1978 | Bray |
| 4,110,219 A | 8/1978 | Maples |
| 4,176,063 A | 11/1979 | Tyler |
| 4,218,317 A | 8/1980 | Kirschmarm |
| 4,391,712 A | 7/1983 | Tyler et al. |

(Continued)

FOREIGN PATENT DOCUMENTS

EP 0857928 A2 12/1998

(Continued)

OTHER PUBLICATIONS

Web site print-out: Aquatic Technology, Reverse Osmosis Filters aquatictech.com. 6 pgs. Copyright 2000.

(Continued)

*Primary Examiner*—Terry K Cecil
(74) *Attorney, Agent, or Firm*—Aleksander Medved

(57) ABSTRACT

A crossflow filtration system including at least one quick dry change crossflow filtration cartridge designed to rotatably interface with a manifold assembly. The quick dry change crossflow filtration cartridge can comprise a membrane element, for example an ultrafiltration membrane, microfiltration membrane, nanofiltration membrane or reverse osmosis membrane element enclosed within a housing. The quick dry change cartridge includes an inlet stream, a permeate stream and a concentrate stream. The manifold assembly includes three similar flow paths; an inlet stream, a permeate stream and a concentrate stream. When engaged, the cartridge and manifold assembly define continuous inlet flow paths, permeate flow paths and concentrate flow paths that connect across the interface. Thus, all of the connections to the water filtration system can be made onto the manifold, and the resulting connected system is compact and easy to connect.

20 Claims, 15 Drawing Sheets

U.S. PATENT DOCUMENTS

| | | | |
|---|---|---|---|
| 4,609,463 A | 9/1986 | Macevicz et al. |
| 4,645,601 A | 2/1987 | Regunathan et al. |
| 4,683,054 A | 7/1987 | Tumbull |
| 4,695,373 A | 9/1987 | Ho |
| 4,695,375 A | 9/1987 | Tyler |
| 4,715,952 A | 12/1987 | Casey, Jr. |
| 4,735,716 A | 4/1988 | Petrucci et al. |
| 4,761,295 A | 8/1988 | Casey |
| 4,770,770 A | 9/1988 | Regunathan et al. |
| 4,789,467 A | 12/1988 | Lindsay et al. |
| 4,794,940 A | 1/1989 | Albert et al. |
| 4,834,873 A | 5/1989 | Burrows |
| 4,867,201 A | 9/1989 | Carten |
| 4,876,002 A | 10/1989 | Marshall et al. |
| 4,877,512 A | 10/1989 | Bowns et al. |
| 4,882,061 A | 11/1989 | Petrucci et al. |
| 4,888,115 A | 12/1989 | Maranaccio et al. |
| 4,937,557 A | 6/1990 | Tucci et al. |
| 4,948,505 A | 8/1990 | Petrucci et al. |
| 4,983,305 A | 1/1991 | Oklejas et al. |
| 4,990,248 A | 2/1991 | Brown et al. |
| 4,992,170 A | 2/1991 | Menon et al. |
| 5,049,270 A | 9/1991 | Carrano et al. |
| 5,083,442 A | 1/1992 | Vlock |
| 5,122,265 A | 6/1992 | Mora et al. |
| 5,133,858 A | 7/1992 | Walz et al. |
| 5,221,473 A | 6/1993 | Burrows |
| 5,269,919 A * | 12/1993 | von Medlin | 210/256 |
| 5,389,260 A | 2/1995 | Hemp et al. |
| 5,435,909 A | 7/1995 | Burrows |
| 5,445,729 A | 8/1995 | Monroe et al. |
| 5,527,450 A | 6/1996 | Burrows |
| 5,580,444 A | 12/1996 | Burrows |
| 5,744,030 A | 4/1998 | Reid et al. |
| 5,753,107 A | 5/1998 | Magnusson et al. |
| 5,762,789 A | 6/1998 | De les Reyes et al. |
| 5,866,001 A | 2/1999 | Hlebovy |
| 5,997,738 A | 12/1999 | Lin |
| 6,099,735 A | 8/2000 | Kelada |
| 6,190,588 B1 | 2/2001 | Schmidt |
| 6,217,751 B1 | 4/2001 | Peeters |
| 6,360,764 B1 | 3/2002 | Fritze |
| 6,416,668 B1 | 7/2002 | Al-Samadi |
| 6,416,673 B2 | 7/2002 | Plester et al. |
| 6,423,223 B1 | 7/2002 | Northcut et al. |
| 6,436,282 B1 * | 8/2002 | Gundrum et al. | 210/117 |
| 6,830,683 B2 * | 12/2004 | Gundrum et al. | 210/232 |
| 6,953,526 B1 * | 10/2005 | Fritze | 210/234 |
| 7,147,772 B2 * | 12/2006 | Fritze | 210/232 |
| 2002/0108906 A1 | 8/2002 | Husain et al. |
| 2002/0158001 A1 | 10/2002 | Northcut et al. |
| 2003/0010698 A1 | 1/2003 | Fritze |
| 2003/0019819 A1 | 1/2003 | Fritze |
| 2003/0217959 A1 | 11/2003 | Fritze |
| 2005/0173333 A1 | 8/2005 | Kloos et al. |

FOREIGN PATENT DOCUMENTS

| | | |
|---|---|---|
| JP | 11-262766 | 9/1999 |
| JP | 2001121146 A2 | 5/2001 |
| JP | 2001246367 A2 | 9/2001 |
| WO | WO 88/09693 A1 | 12/1988 |
| WO | WO 98/00220 A1 | 1/1998 |
| WO | WO 01/80967 A1 | 11/2001 |
| WO | WO 03/090898 A1 | 11/2003 |
| WO | WO 03/101575 A2 | 12/2003 |

OTHER PUBLICATIONS

Web site print-out: Clean, safe, luxurious lifestyle with home water filter Crystal Pure Water Company; purewatereXpress.com, 6 pgs.; Copyright 1999.

"Merlin Point-Of-Use Drinking Water System", GE Infastructure Water and Process Technologies, Brochure, Copyright 2004; 8 Pages.
US 4,936,985, 06/1990, Hahm (withdrawn)

* cited by examiner

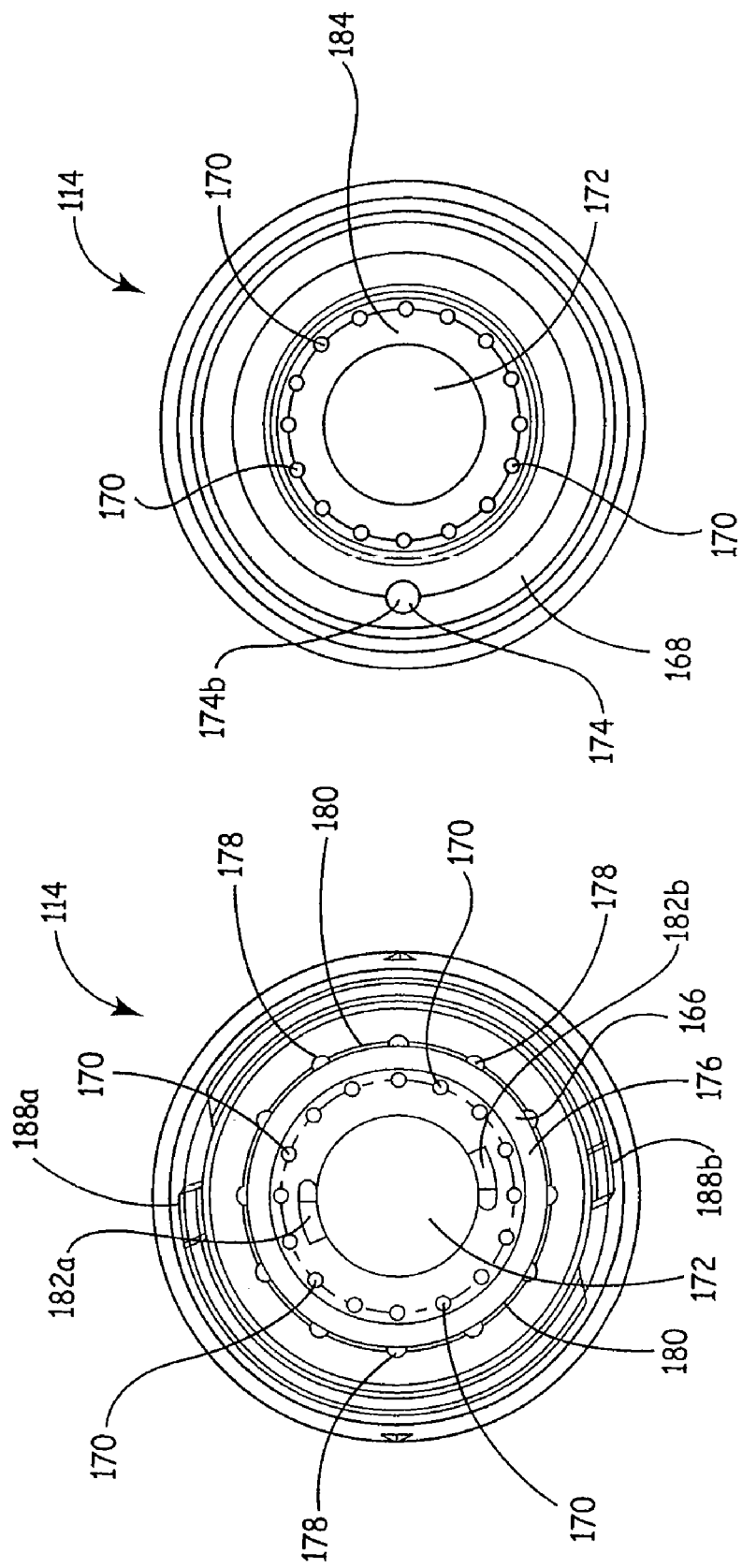

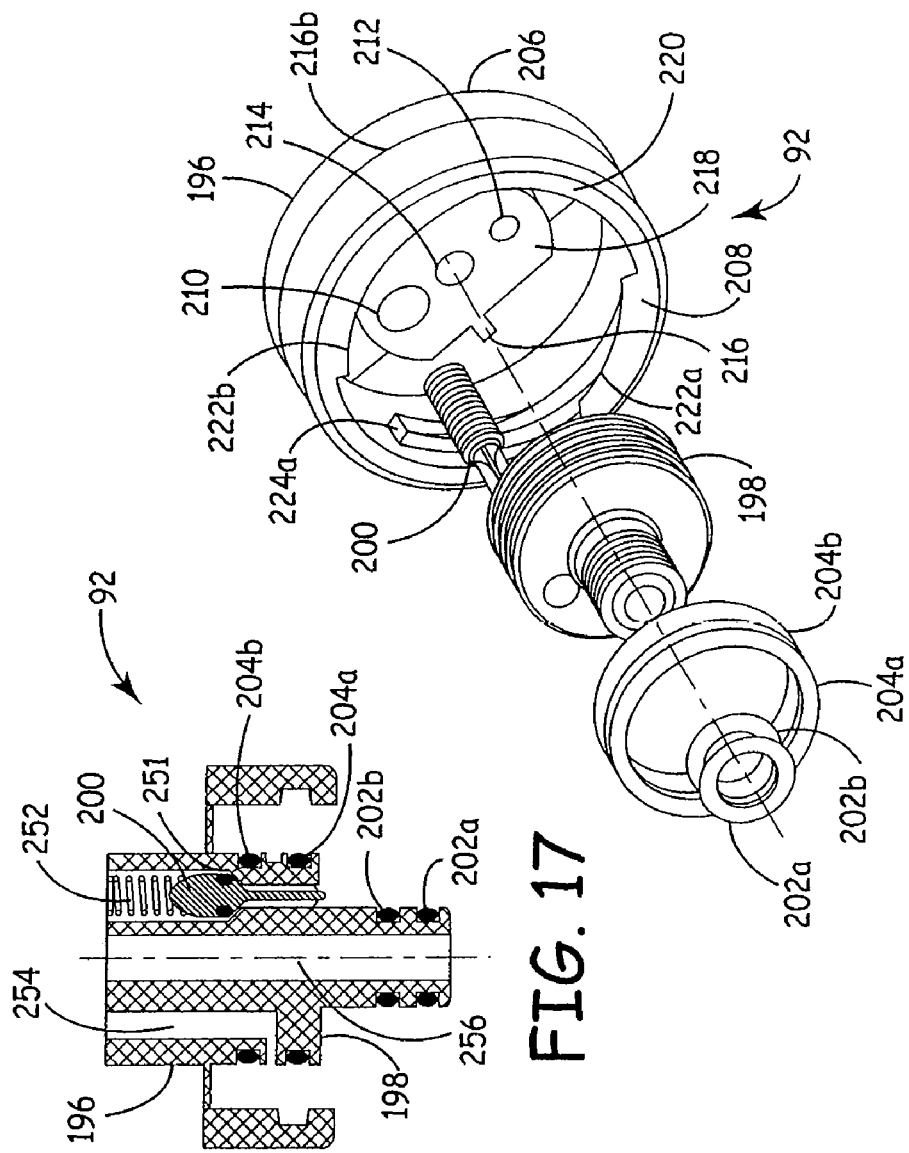

CROSSFLOW FILTRATION SYSTEM WITH QUICK DRY CHANGE ELEMENTS

RELATED APPLICATIONS AND PRIORITY CLAIM

This application is a continuation of U.S. application Ser. No. 10/838,140 filed May 3, 2004, now abandoned, which claims priority to U.S. Provisional Application No. 60/467,663, filed May 2, 2003 entitled, "RESIDENTIAL REVERSE OSMOSIS SYSTEM WITH QUICK DRY CHANGE ELEMENTS," which is hereby incorporated by reference in its entirety.

FIELD OF THE INVENTION

The present invention relates generally to the field of water filtrations systems. More specifically, the present invention relates to crossflow filtration systems utilizing a crossflow filtration element capable of being added and replaced by a quick connect attachment.

BACKGROUND OF THE INVENTION

Water filtration systems designed for use in the home are well known. Due to increasing concerns with regard to water quality, be it supplied by a well or a municipality, the popularity of such systems has increased markedly. Some water filtration systems incorporate reverse osmosis filtration.

Typical reverse osmosis systems include a reverse osmosis membrane assembly, a pressure tank, a control element, a purified water faucet and a tubing/piping assembly defining the various flow paths. In general, an inlet water source is supplied to the membrane assembly where it is separated into a purified water stream (commonly referred to as permeate) and a concentrated waste stream (commonly referred to as concentrate). The permeate may flow to a pressure tank where it can subsequently be accessed through the pure water faucet. The concentrate is typically piped directly to drain. The control element working in conjunction with a series of valves in the tubing/piping assembly and the pure water faucet generally operates the system and may include various monitoring sensors, for example conductivity/resistivity and flow sensors to insure the system is functioning properly.

SUMMARY OF THE INVENTION

The present invention comprises a crossflow filtration system, for example a residential crossflow filtration system, including at least one quick dry change crossflow filtration cartridge designed to rotatably interface with a manifold assembly. The quick dry change crossflow filtration cartridge can comprise a membrane element, for example an ultrafiltration membrane, microfiltration membrane, nanofiltration membrane or reverse osmosis membrane element enclosed within a housing. A rotatably engaging cartridge fastener has two mated elements with one element attached to the housing of the filtration cartridge and the mated second element of the fastener attached to a docking port on the manifold. The housing includes a housing cap having the first fastener element for rotatably connecting to the mated second fastening element at the docking port on the manifold assembly. The fastener can comprise a variety of designs of mated elements, for example, angled tabs, grooves, helical threads, multi-stage engagement members using threads and/or tabs and combinations thereof. Similarly, the mated second fastening element can comprise corresponding mated elements, such as angled tabs, grooves, ramps, multi-stage engagement members or combinations thereof, for interfacing with the first fastener element. The port on the manifold can also comprise a variety of capture mechanisms such that the cartridge fastener does not disengage unintentionally. Examples of appropriate rotatably engaging cartridge fasteners contemplated for use with the water purification systems described herein include, for example, those disclosed in U.S. patent application Ser. Nos. 09/618,686, now U.S. Pat. No. 6,953,526; 10/196,340, now abandoned; 10/202,290, now abandoned; and 10/406,637, now U.S. Pat. No. 7,147,772 all of which are hereby incorporated by reference in their entirety.

The quick dry change cartridge includes three flow paths within the housing and a crossflow filtration media element. The three flow paths include an inlet stream, a permeate stream and a concentrate stream. The manifold assembly includes three similar flow paths; an inlet stream, a permeate stream and a concentrate stream. When engaged, the cartridge and manifold assembly define continuous inlet flow paths, permeate flow paths and concentrate flow paths that connect across the interface. Thus, all of the connections to the water filtration system can be made onto the manifold, and the resulting connected system is compact and easy to connect. In contrast, reverse osmosis designs with a separate condensate drain are represented by U.S. Pat. Nos. 3,746,640, 4,391,712, 4,876,002, 5,122,265, 5,435,909, 5,527,450, 5,580,444 and 6,436,282, all of which are hereby incorporated by reference in their entirety.

When the filtering capacity of the crossflow filtration media element is consumed, the unitary construction of the cartridge allows for quick and easy replacement with a new cartridge containing a new crossflow filtration media element. As there is no disassembly of the cartridge filter, the replacement process can be accomplished without water spillage. In addition, the time required is only that necessary to rotatably remove a spent cartridge and rotatably install a new cartridge. Generally, disassembly and reassembly of the housing and filter cartridge can be performed by hand without any tool, although a tool can be used if desired. In certain embodiments, the filtering characteristics of the crossflow filtration system can be adjustably varied by replacing a cartridge filter having a first media with a new cartridge filter having a second type of filtration media. In addition, operational performance of the crossflow filtration system can be adjusted, which may be desired due to changes in the feedwater chemistry, simply by replacing cartridge filters wherein the cartridge filter includes a specific orifice, thereby controlling overall recovery of the crossflow filtration system. Adjustment can be performed by varying the backpressure on the concentrate stream, for example, by using a flow restrictor such as an orifice or valve.

In a first aspect, the invention pertains to a crossflow filtration system comprising a crossflow cartridge filter and a manifold. The crossflow cartridge filter can comprise a housing, an enclosed crossflow filtration media and a first fastener element defining three filter connections that are respectively in fluid communication with a filter feed channel, a filter permeate channel and a filter concentrate channel passing within the cartridge filter. The manifold can comprise a second fastener element mated with the first fastener element, the manifold having three manifold flow channels that connect respectively to three manifold connections on the second fastener element. The three manifold connections connect on a one-to-one basis with the three filter connections when the first fastener element is engaged with the second fastener element.

In another aspect, the invention pertains to a crossflow filtration filter comprising a filter housing, a crossflow filtration element and a filter cap. The crossflow filtration element can comprise a crossflow filtration media such as a microfiltration membrane, an ultrafiltration membrane, a nanofiltration membrane or a reverse osmosis membrane. The filter cap can include channels for directing and distributing a feed water stream, a concentrate stream and a permeate stream. The filter cap can further comprise engagement members allowing for interconnection, for example rotatable engagement, with a filter manifold.

In another aspect, the invention pertains to a crossflow filtration manifold comprising a manifold body and a manifold connection. The manifold body and the manifold connection can define a feed flow channel, a permeate flow channel and the a concentrate flow channel. The manifold connection can include an engagement member for allowing rotatable connection with a cartridge filter. The crossflow filtration manifold can include a flow restriction, such as a valve or orifice, in the concentrate flow channel to backpressure and control the water recovery for a crossflow filtration cartridge. The crossflow filtration manifold can include a biased closed valve in the feed flow channel to prevent water spillage when the manifold is not engaged with a cartridge filter. The crossflow filtration manifold can include a check valve in the permeate flow channel to prevent backward flow of filtered water through the manifold.

In another aspect, the invention pertains to a method for forming a water filtration system with a crossflow filter. The method comprises connecting the crossflow filter to a manifold such a feed flow circuit, a permeate flow circuit and a concentrate flow circuit are formed and isolated by a crossflow filtration media.

BRIEF DESCRIPTION OF THE DRAWINGS

FIG. 7 is a top, end view of the filter cap of FIG. 6.

FIG. 8 is a bottom, end view of the filter cap of FIG. 6.

FIG. 10 is an exploded, perspective view of a manifold assembly.

FIG. 16 is a side view of the manifold assembly of FIG. 10.

FIG. 17 is a sectional, side view of the manifold assembly of FIG. 10 take along line A-A of FIG. 16.

DETAILED DESCRIPTION OF THE PREFERRED EMBODIMENTS

Figure 1:
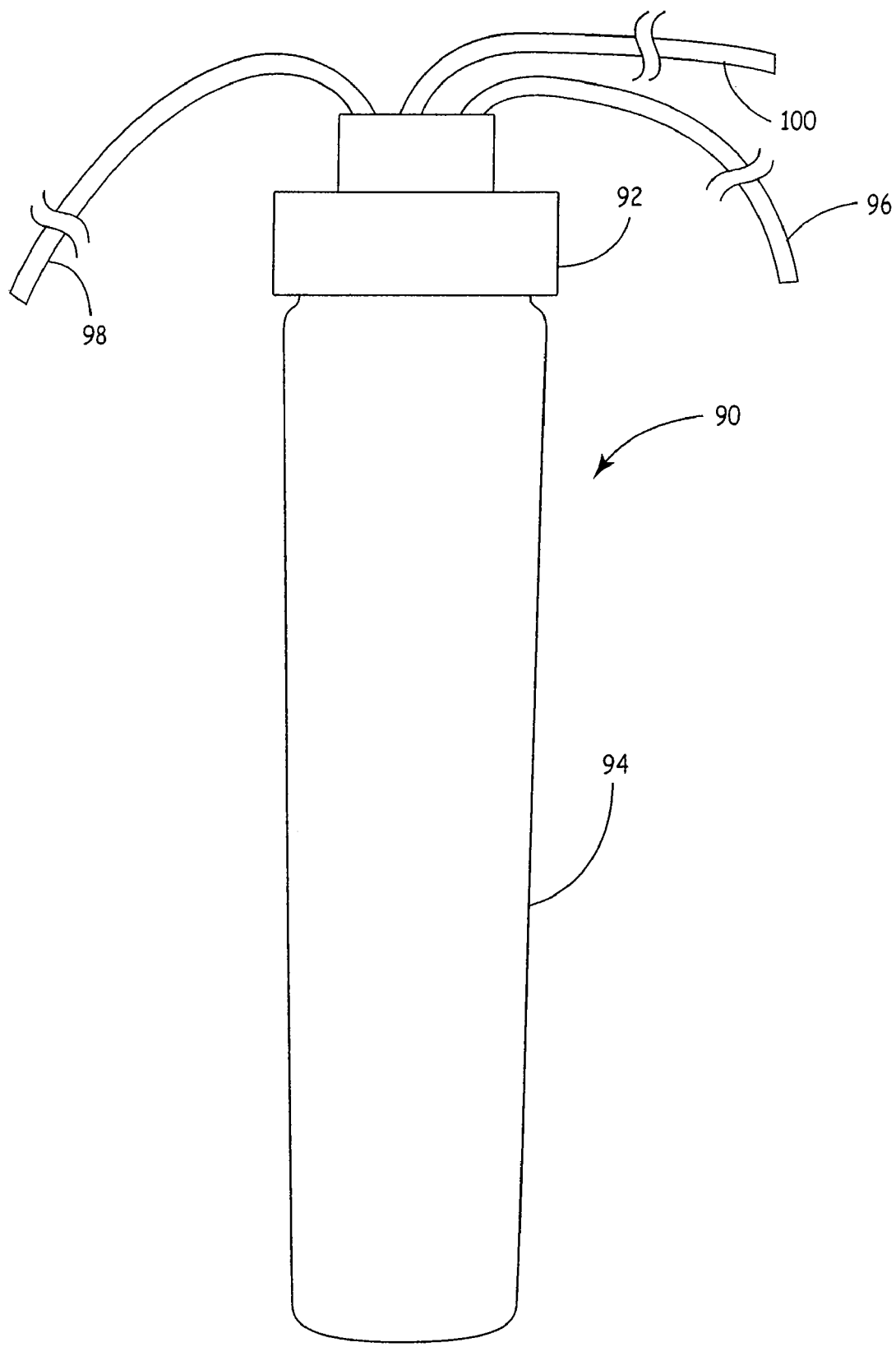
FIG. 1 is a side view of a crossflow filtration assembly.

As illustrated in FIG. 1, an embodiment of a crossflow filtration assembly 90 of the present invention comprises a manifold assembly 92 and at least one crossflow cartridge filter 94. As depicted in FIG. 1, an embodiment of the crossflow filtration assembly 90 includes a supply tube 96, a concentrate tube 98 and a permeate tube 100.

Figure 2:
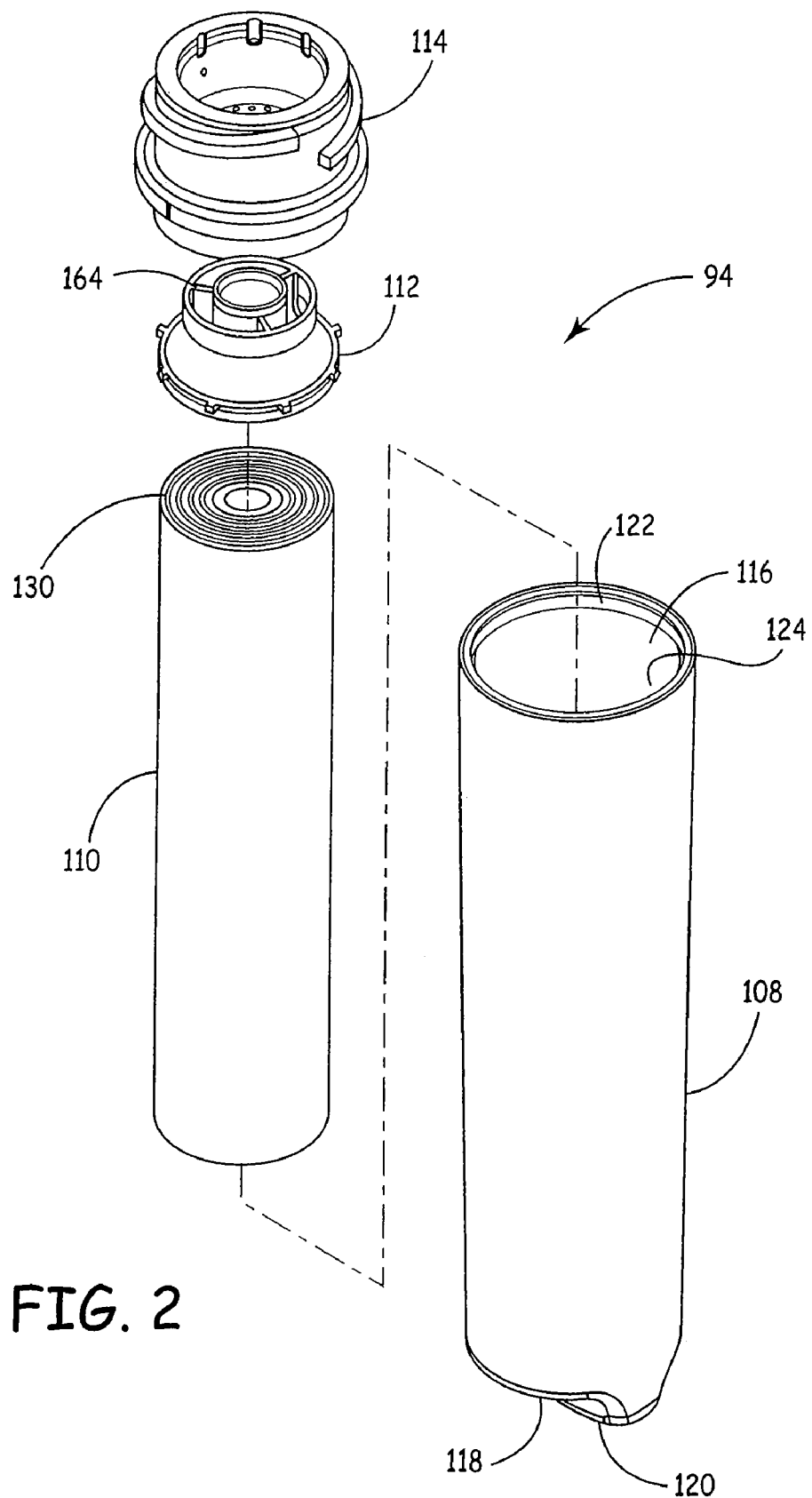
FIG. 2 is an exploded, perspective view of a crossflow cartridge filter.

The crossflow cartridge filter 94 is more clearly illustrated in FIG. 2. Generally, crossflow cartridge filter 94 comprises a filter housing 108, a crossflow filtration element 110, a flow director 112 and a filter cap 114. Filter housing 108, flow director 112 and filter cap 114 are constructed of suitable polymers for example, polypropylene or polyethylene. Crossflow cartridge filter 94 is constructed so as to be fixedly sealed and closed such that when replacement is necessary, the entire cartridge is replaced as opposed to replacing individual cartridge components such as crossflow filtration element 110. This system has a single filter element. Different systems can incorporate different numbers of filter elements, such as two, three, four or more of the same or different types, as well as holding tanks. One particular design with multistage filtration is described further below.

Figure 3:
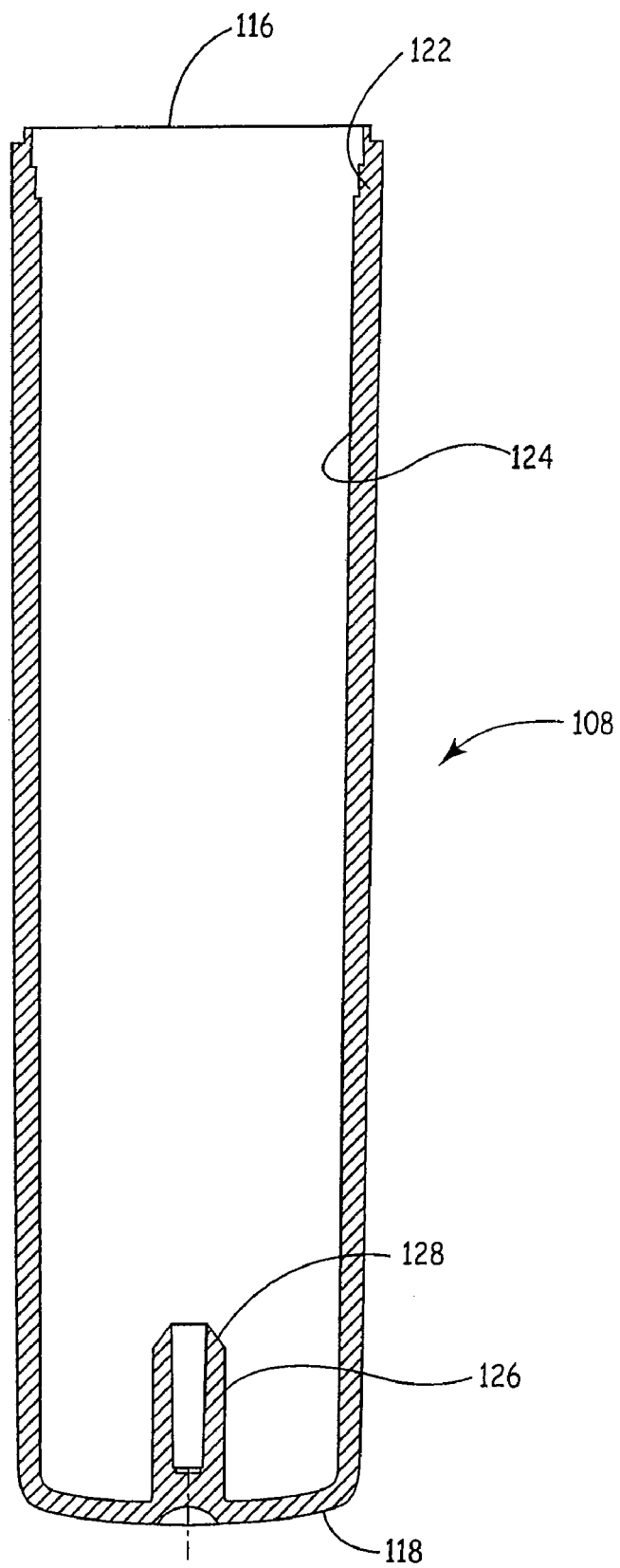
FIG. 3 is a sectional, side view of a filter housing.

As is shown in FIGS. 2 and 3, filter housing 108 comprises a molded polymeric structure having an open end 116 and a closed end 118. In some embodiments, filter housing 108 comprises a gripping element 120 as shown in FIG. 2, for example a projecting surface, on closed end 118. Open end 116 can include an internal circumferential notch 122 to promote the interconnection and assembly of crossflow cartridge filter 94. Filter housing 108 generally can have a smooth inner wall 124 and can include an internal projection 126 protruding upward from the internal surface of closed end 118, as shown in the cross-sectional view of FIG. 3. Internal projection 126 can comprise a tapered guide surface 128 for use during assembly of crossflow cartridge filter 94.

Figure 4:
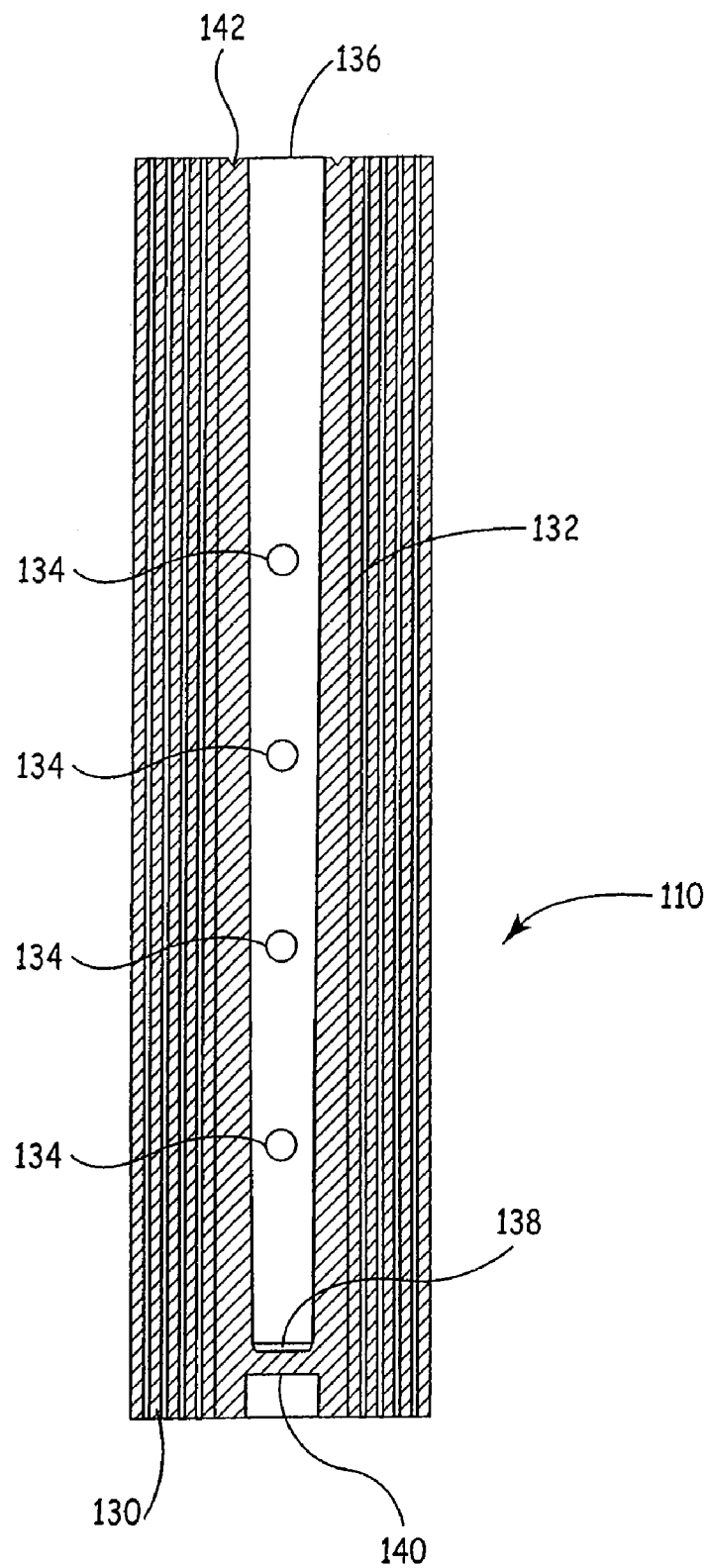
FIG. 4 is a sectional, side view of a crossflow filtration element.

As depicted in FIG. 4, crossflow filtration element 110 can comprise a spirally wound design referred to as a spiral wound element, in which a crossflow filter membrane media 130 is glued to and wrapped around an interior permeate tube 132 having one or a plurality of tube bores 134. Permeate tube 132 has a cylindrical configuration including an open tube end 136, a closed end 138 and a tube recess 140. At open tube end 136, permeate tube 132 includes a weld channel 142. A tube recess 140 can be dimensioned to accommodate insertion of internal projection 126 of filter housing 108 (FIG. 3) during assembly. For purposes of clarity, it is to be understood that the tube bores 134 are located between open end 136 and closed end 138.

In some embodiments, the crossflow filter membrane media 130 can comprise two sheets of membrane, for example sheets of reverse osmosis, nanofiltration, ultrafiltration or microfiltration membrane, sandwiched over a spacer material. The two sheets of membrane can be glued around three sides with a fourth side being open and glued to the permeate tube 132 allowing water to be filtered through the individual flat sheets, into the spacer material, through the tube bores 134 and finally into permeate tube 132. The crossflow filter membrane media 130 can be manufactured of polymers such as cellulose acetate, polyamide and polysulfone. Suitable crossflow filter membrane media 130 is manufactured and sold by companies such as GE Water Technologies (formerly Osmonics, Inc.), Dow Liquid Separations/

FilmTec, Hydranautics and Koch Membrane Systems, among others. In alternative embodiments, the crossflow filter membrane 130 can comprise tubular elements and/or sheets of membrane.

Figure 5:
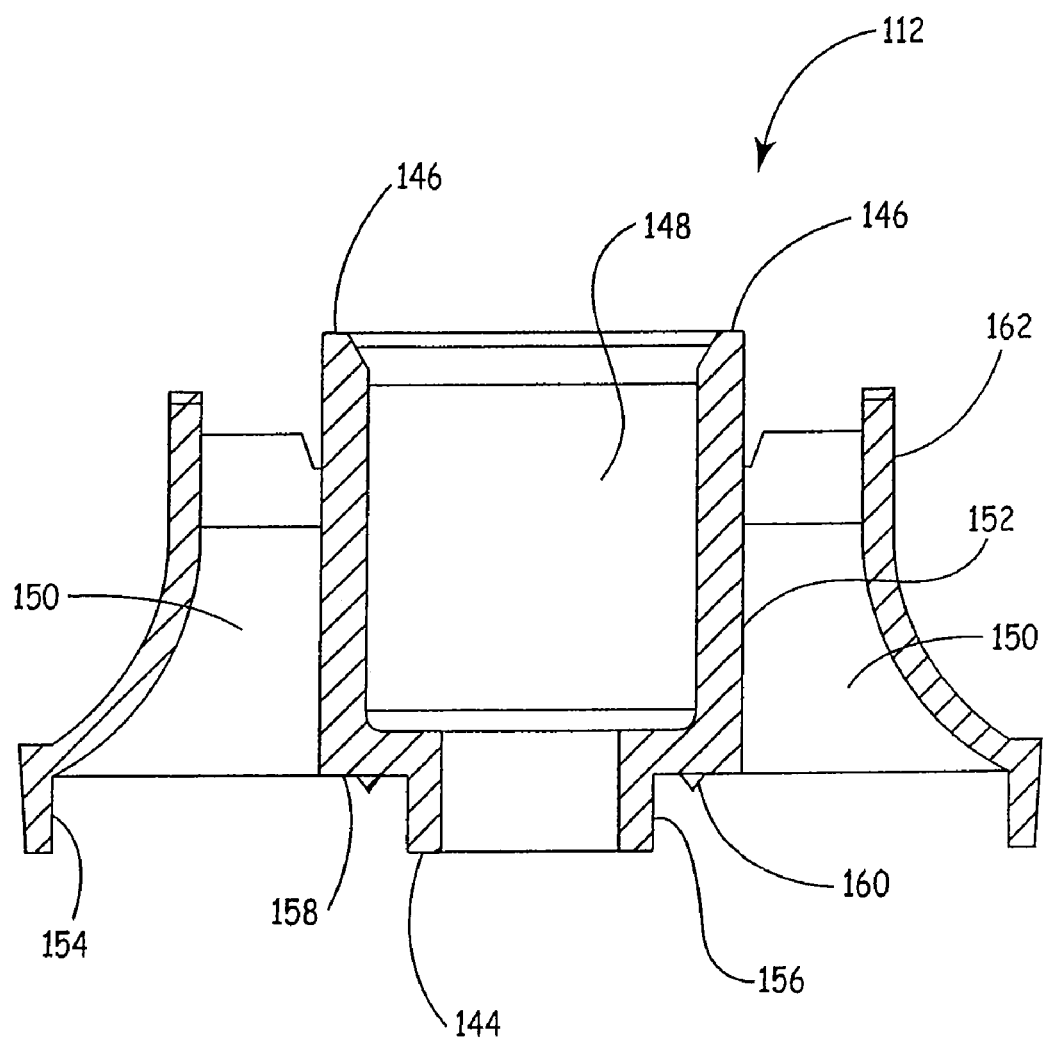
FIG. 5 is a sectional, side view of a filter dam.
Figure 6:
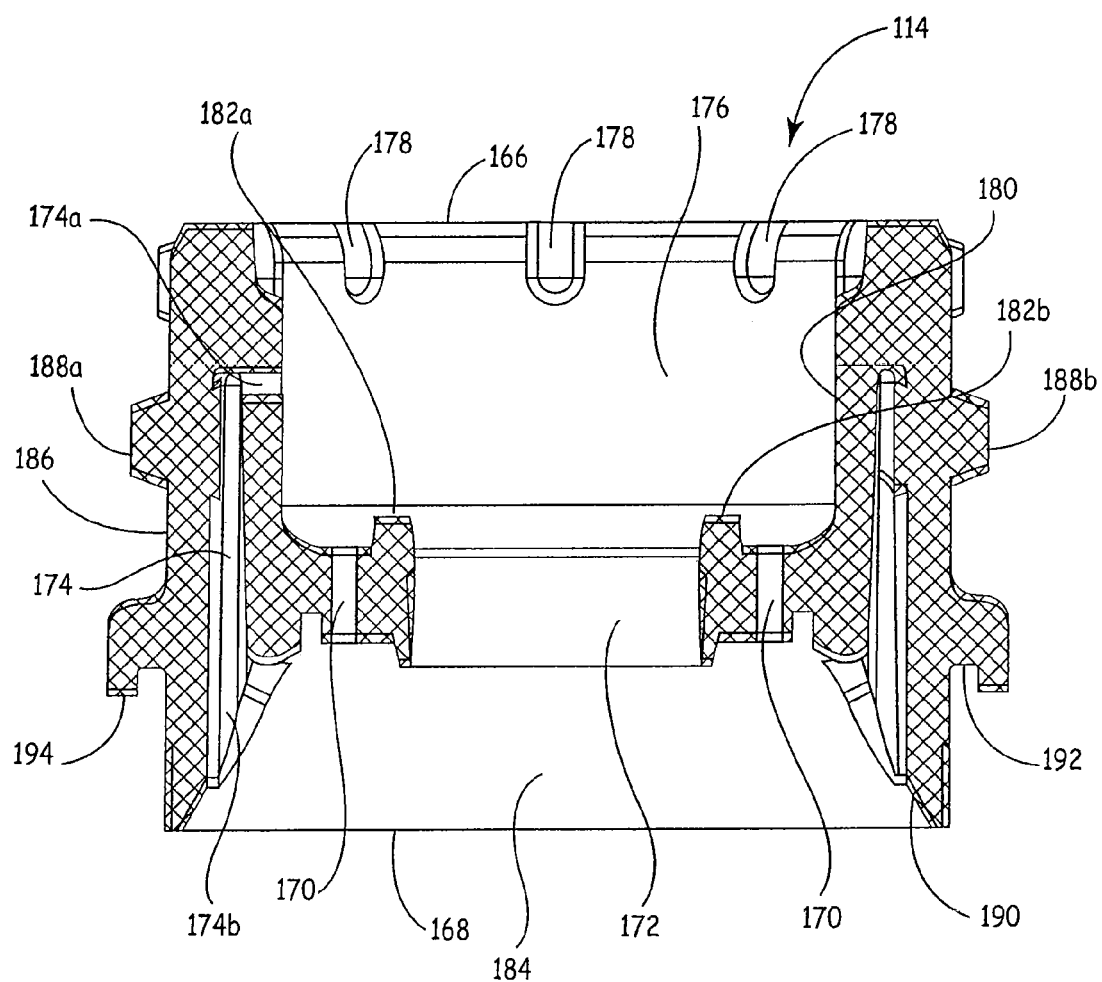
FIG. 6 is a sectional, side view of a filter cap.

Flow director 112 depicted in FIGS. 2 and 5, comprises a media end 144, a cap end 146, a central throughbore 148 and a plurality of perimeter throughbores 150. Central throughbore 148 and perimeter throughbores 150 are isolated by interior wall 152. Media end 144 has a circular configuration with a diameter slightly greater than open end 136 of interior permeate tube 132 such that a circumferential projecting lip 154 projects around the perimeter of crossflow filtration element 110. Central throughbore 148 interfaces with media end 144 at a projecting sealing surface 156. Projecting sealing surface 156 is dimensioned for insertion into open end 136 and includes a flanged sealing surface 158 having a circumferential weld energy director 160 corresponding to weld channel 142 of interior permeate tube 132. Cap end 146 is defined by end surfaces of an exterior wall 162, interior wall 152 and a plurality of support ribs 164 shown in FIG. 2.

Filter cap 114 depicted in FIGS. 2, 6, 7 and 8 comprises a manifold engagement end 166, a cartridge sealing end 168, a plurality of supply throughbores 170, a central permeate throughbore 172 and a concentrate bore 174. Permeate throughbore 172 is dimensioned to accommodate the insertion of interior wall 152 of filter damn 112. Concentrate bore 174 is defined by an outlet portion 174a and an inlet portion 174b. Outlet portion 174a can comprise a precision drilled or molded bore restriction. Alternatively, an orifice, for example a drilled orifice with an orifice filter, can be mounted within the outlet portion 174a to provide a desired cross-sectional opening with the outlet portion 174a. An interconnecting cavity 176 is exposed at manifold engagement end 166 and includes a plurality of notches 178 along a perimeter wall 180 of interconnecting cavity 176. Also within interconnecting cavity 176 is a pair of arcuate interface ramps 182a, 182b. A sealing cavity 184 is exposed at cartridge sealing end 168 and is dimensioned to accommodate flow director 112. Filter cap 114 includes an exterior surface 186 including a fastening element for connecting with a mated fastening element on the assembly manifold 102. The fastening element can comprise a pair of circumferential ramps 188a, 188b, also depicted in FIG. 2. For interfacing with filter housing 108, the filter cap comprises a circumferential insertion lip 190, a circumferential recess 192 and a circumferential flange 194. While in this embodiment filter damn 112 and filter cap 114 are separate elements, these elements can be formed as a single integral unit.

Figure 9:
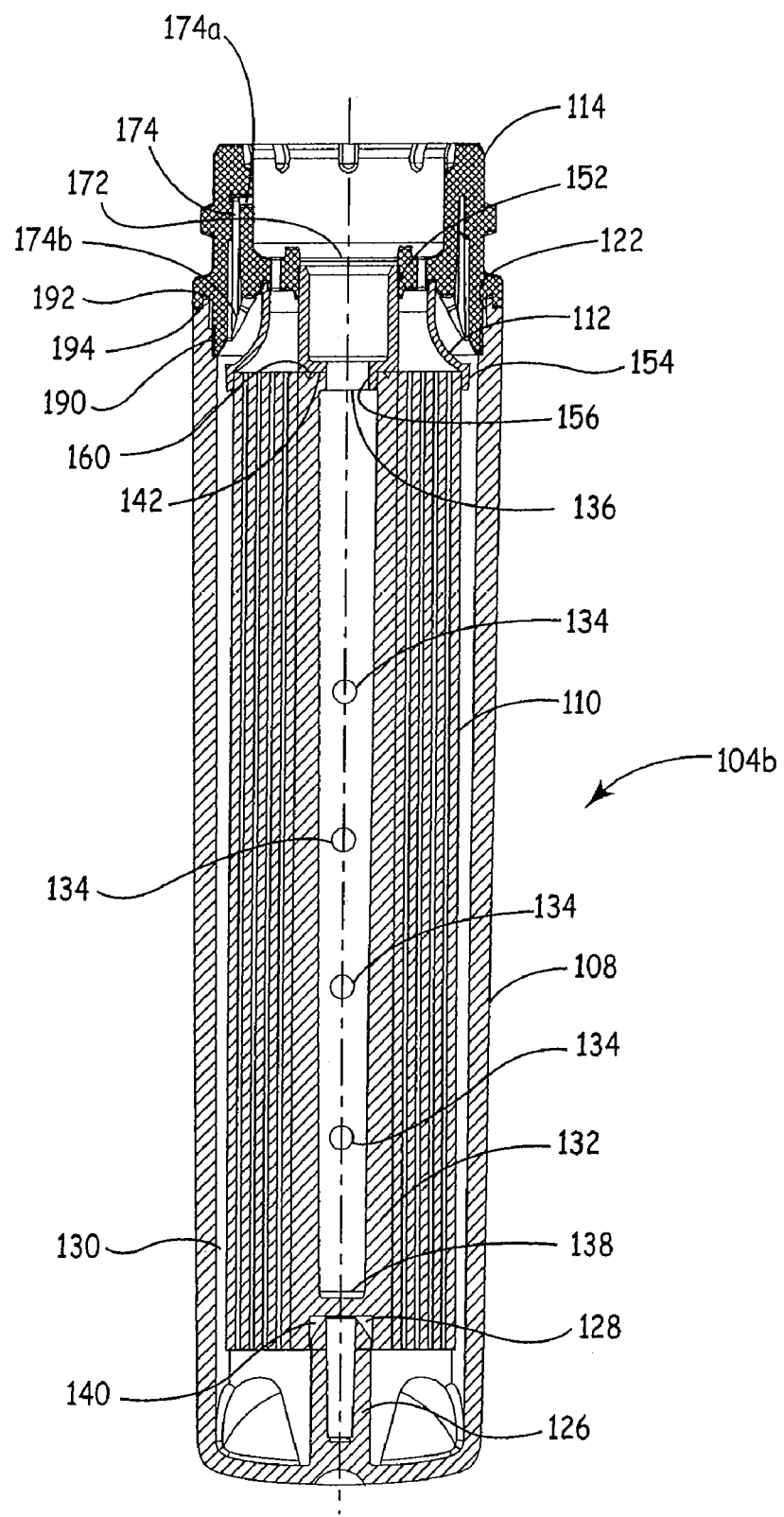
FIG. 9 is a sectional, side view of a crossflow cartridge filter.
Figure 15:
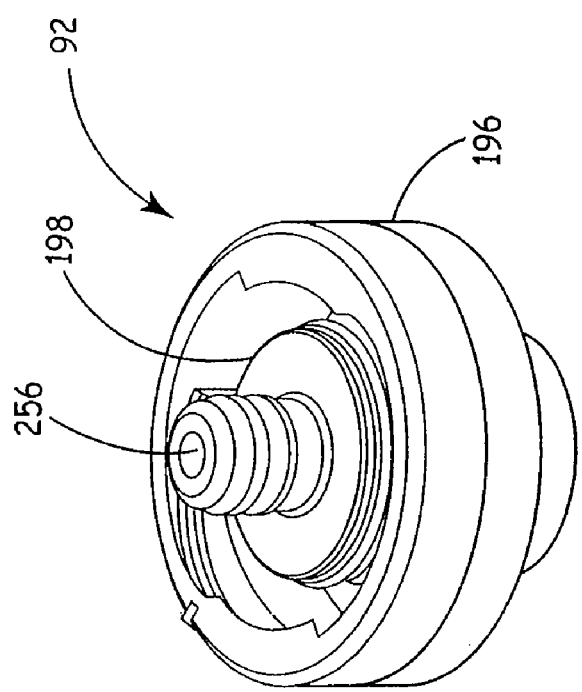
FIG. 15 is a perspective, end view of the manifold assembly of FIG. 10.

A sectional view of an assembled crossflow cartridge filter 94 is illustrated in FIG. 9. Flow director 112 is positioned with respect to crossflow filtration element 110 such that the projecting sealing surface 156 is slidingly inserted into the open tube end 136. When properly positioned, weld energy director 160 at least partially resides within weld channel 142. Using a suitable welding process, for example spin welding or ultrasonic welding, the weld energy director 160 and weld channel 142 can be attached. At the same time, projecting lip 154 can be sealed by friction bonding and/or the use of a suitable adhesive about the outside of crossflow filtration element 110. Crossflow filtration element 110 is directed into the open end 116 of filter housing 108 such that the internal projection 126 is inserted into the tube recess 140. Filter cap 114 is positioned and directed such that the cartridge sealing end 168 is proximal the cap end 146 and the open end 116, causing slidable insertion of the interior wall 152 into the central permeate throughbore 172. Simultaneously, the circumferential insertion lip 190, circumferential recess 192 and the circumferential flange 194 contact the filter housing 108, for example at internal circumferential notch 122. Using a suitable welding process, for example spin welding or ultrasonic welding, filter cap 114 is welded to filter housing 108 to form the completed crossflow cartridge filter 94. Suitable adhesive sealing methods can also be employed during the assembly of crossflow cartridge filter 94 in addition or as an alternative to a welding process.

When assembled, crossflow cartridge filter 94 defines three distinct flow circuits: a feed water flow circuit, a permeate flow circuit and a concentrate flow circuit. Incoming feed water enters the feed water flow circuit through the supply throughbores 170 such that the feed water flows through the filter cap 114. The feed water then passes through the perimeter throughbores 150 on the flow director 112 and into crossflow filtration element 110. As the feed water passes across the crossflow filter membrane media 130, purified water enters the permeate flow circuit through the tube bores 134 in the interior permeate tube 132. The permeate flow circuit is defined by the interior permeate tube 132, the central throughbore 148 on the flow director 112 and the central permeate throughbore 172 on filter dam 114. Any water that passes across crossflow filtration element 110 without entering the permeate flow circuit flows out the bottom of the crossflow filtration element 110 and into the concentrate flow circuit. The concentrate flow circuit is first defined by the gap between the exterior of the crossflow filtration element 110 and the smooth inner wall 124. The concentrate fluid circuit is further defined by the concentrate bore 174 whereby concentrate is collected and distributed out of the crossflow cartridge filter 94.

As illustrated in FIG. 10, an embodiment of manifold assembly 92 can comprise a distributing member 196, a connecting member 198, a spring loaded valve 200, a pair of first O-ring seals 202a, 202b and a pair of second O-ring seals 204a, 204b.

Figure 11:
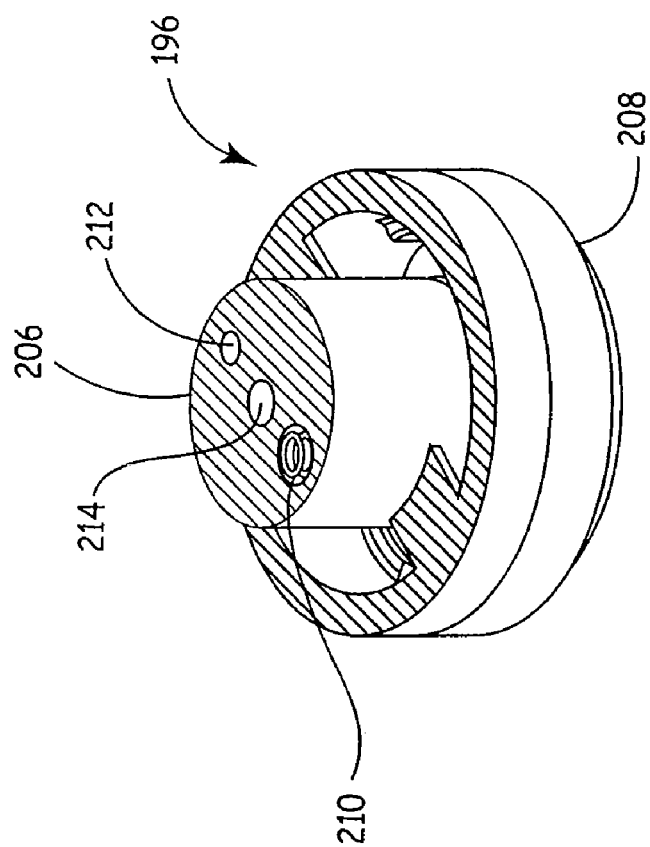
FIG. 11 is a perspective view of a distributing member.

Distributing member 196 is illustrated in FIGS. 10 and 11. Distributing member 196 has a distribution end 206 and a connection end 208. Extending between the distribution end 206 and the connection end 208 are a distribution feed throughbore 210, a distribution concentrate throughbore 212 and a distribution permeate throughbore 214. Located on connection end 208 is a pair of attachment projections 216. Connection end 208 further includes a connecting surface 218 and a perimeter distribution wall 220. Perimeter distribution wall 220 includes a filter receiving means, shown as a pair of tabs 222a, 222b and a pair of sloped members 224a, 224b.

Figure 13:
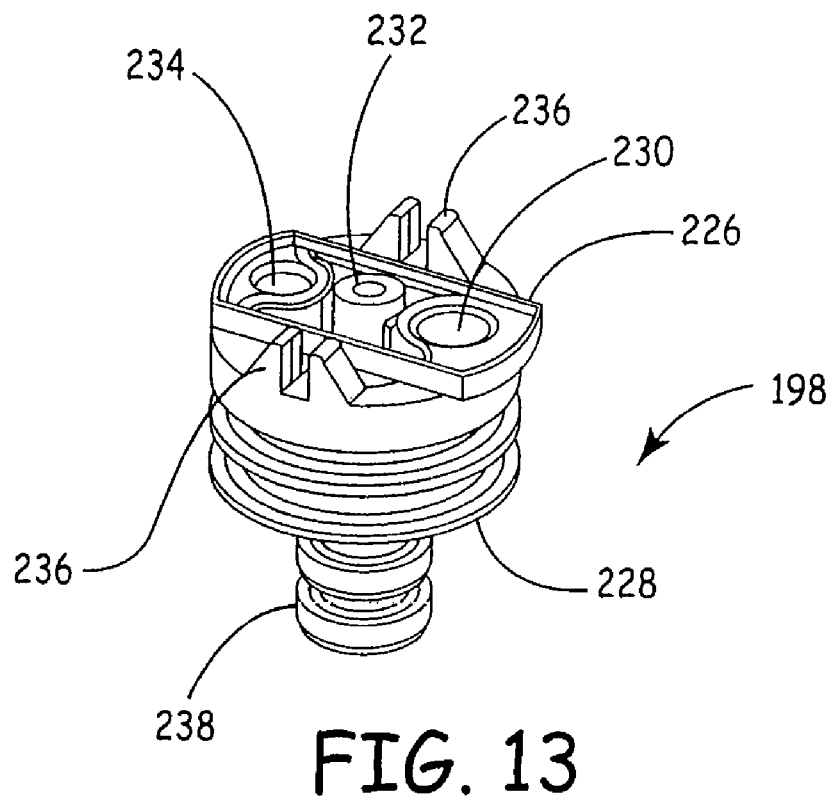
FIG. 13 is a perspective view of the connecting member of FIG. 12.
Figure 12:
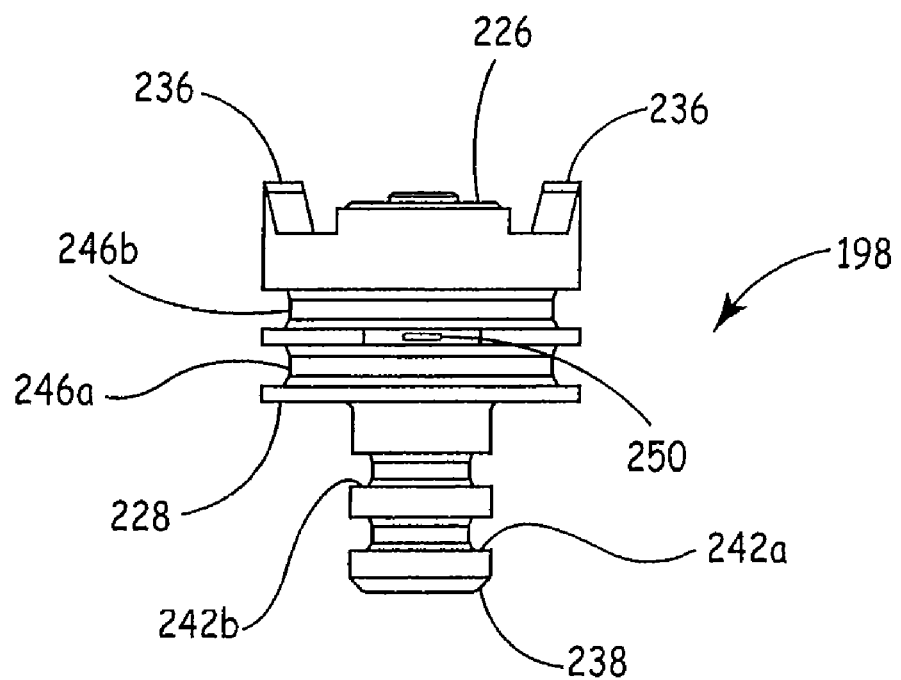
FIG. 12 is a side view of a connecting member.
Figure 14:
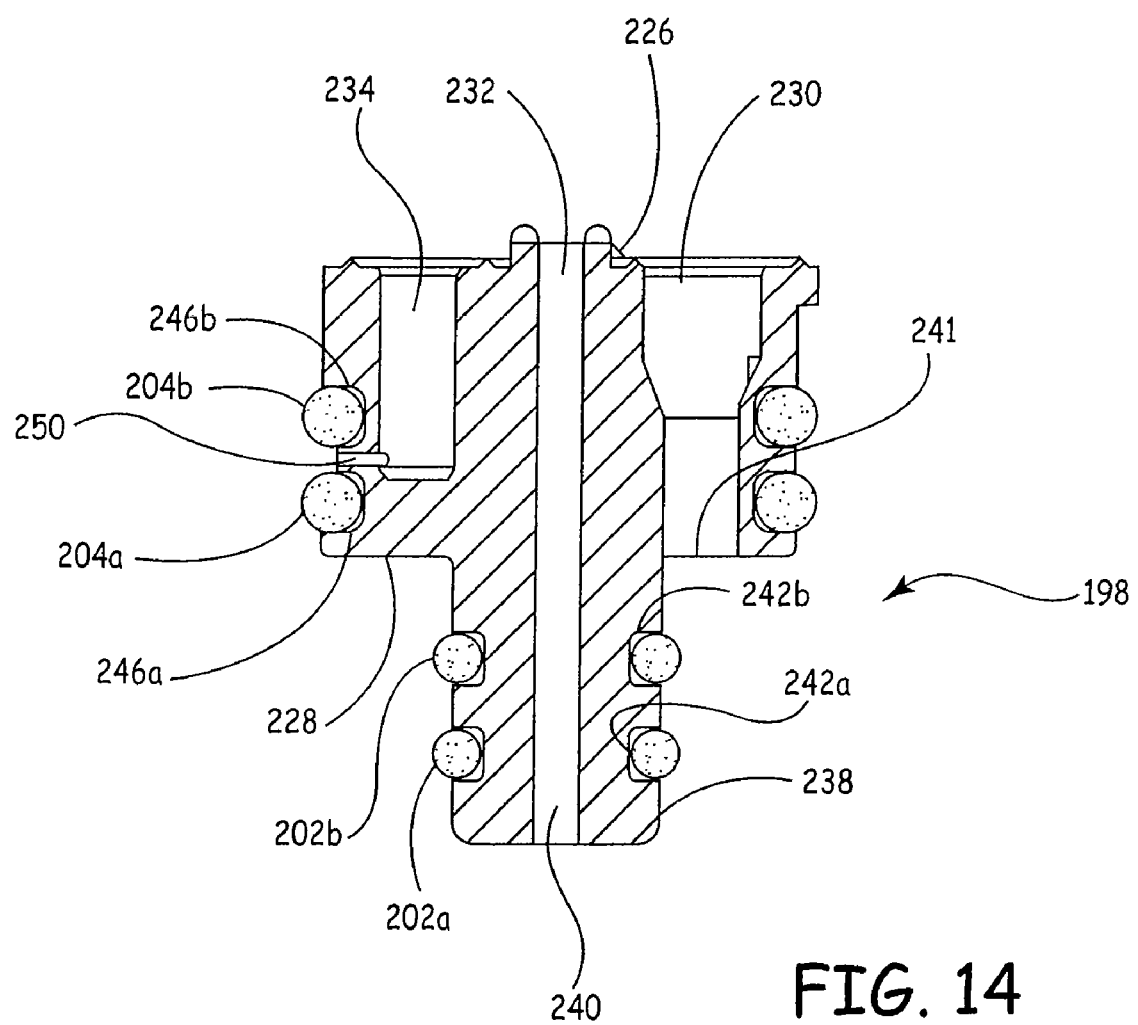
FIG. 14 is a sectional, side view of the connecting member of FIG. 12.

Connecting member 198, as shown in FIGS. 12, 13 and 14, includes a manifold attachment end 226 and a filter attachment end 228. Manifold attachment end 226 includes a feed inlet bore 230, a permeate outlet bore 232 and a concentrate outlet bore 234. Manifold attachment end 226 further includes a pair of manifold attachment members 236 for interconnection of the connecting member 198 to the distributing member 196. Filter attachment end 228 includes a connector projection 238 with a permeate throughbore 240 in fluid connection with the permeate outlet bore 232. Filter attachment end 228 further includes a feed outlet bore 241. Connector projection 238 has a pair of circumferential projection grooves 242a, 242b for receiving the O-ring seals 202a, 202b. Connector projection 238 has a diameter such that connector projection 238 inserts into the central permeate throughbore 172. Connecting member 198 includes a pair of circumferential body grooves 246a, 246b for receiving O-ring seals 204a, 204b. Located between circumferential body grooves 246a, 246b is a concentrate inlet bore 250.

Manifold assembly 92 is generally constructed as shown in FIGS. 10, 15, 16 and 17. Distributing member 196 is oriented such that the connection end 208 is facing the manifold attachment end of the connecting member 198. The spring loaded valve 200 is positioned such that it is captured and resides on a valve seat 251 within the distribution feed throughbore 210 and the feed inlet bore 230 as the distributing member 196 and the connecting member 198 are coupled. As the distributing member 196 and the connecting member 198 come into contact, the manifold attachment members 236 slide over the attachment projections 216. Once the connection end 208 and the manifold attachment end 226 are in physical contact, the distributing member 196 and the connecting member 198 are joined with a suitable joining technique, for example sonic welding and/or adhesive bonding. When the distributing member 196 and the connecting member 198 are operably joined, a continuous manifold feed channel 252 is defined by the distribution feed throughbore 210, the feed inlet bore 230 and the feed outlet bore 241; a continuous manifold concentrate channel 254 is defined by the concentrate inlet bore 250, the concentrate outlet bore 234 and the distribution concentrate throughbore 212; and a continuous manifold permeate channel 256 is defined by the permeate throughbore 240, the permeate outlet bore 232 and the distribution permeate throughbore 214. In alternative embodiments, the distribution member and the connection member can be formed as a single integral unit.

Figure 18:
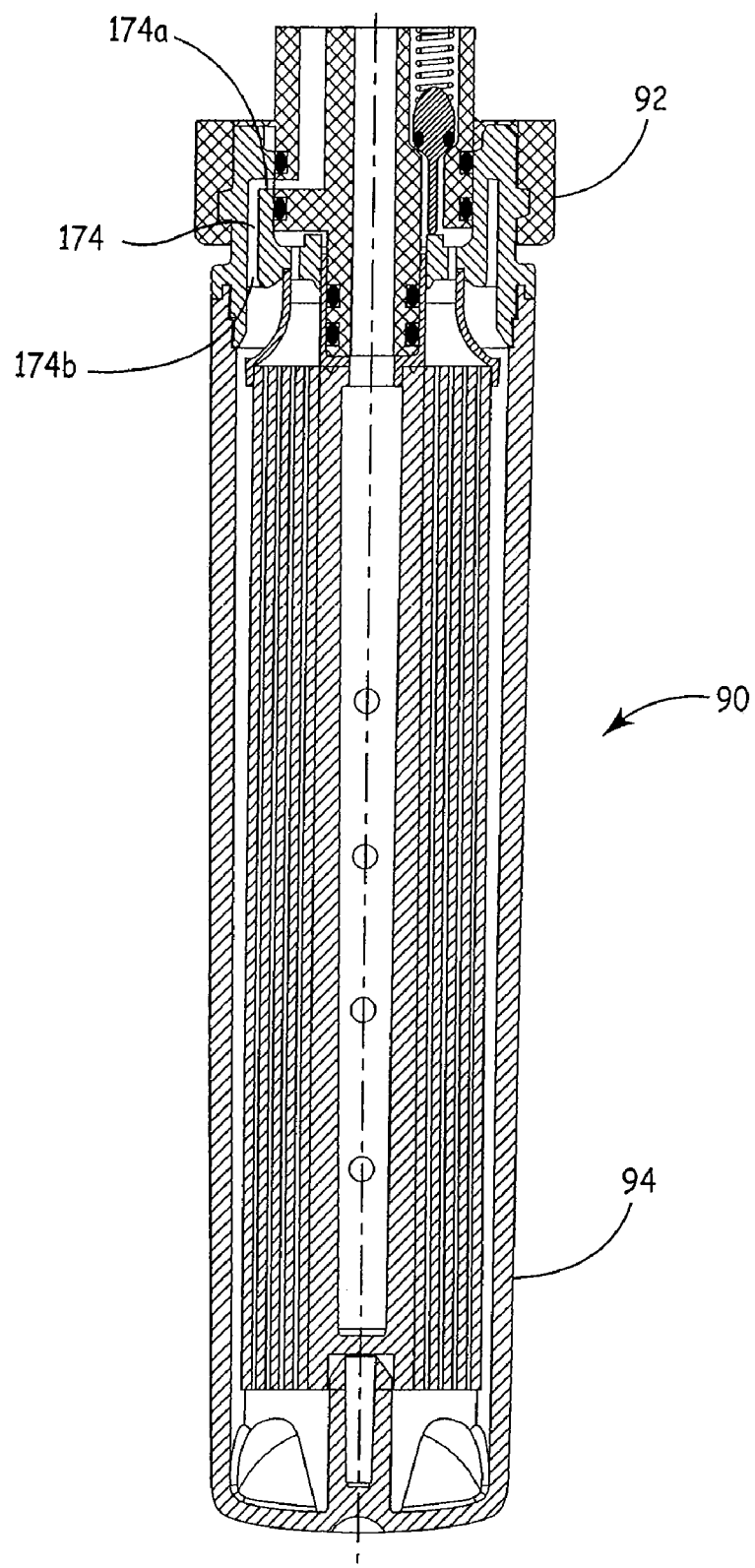
FIG. 18 is a sectional, side view of the crossflow filtration assembly of FIG. 1.

Following the assembly and plumbing of manifold assembly 92, the crossflow cartridge filter 94 is sealingly attached to the manifold assembly 92 as shown in FIG. 18. In one embodiment, the crossflow cartridge filter 94 is rotatably coupled to the manifold assembly 92. Crossflow cartridge filter 94 is positioned and aligned such that central throughbore 148 is in alignment with and proximate to connector projection 238. Connector projection 238 is slidably inserted into central throughbore 148 such that circumferential ramps 188a, 188b physically contact tabs 222a, 222b. Crossflow cartridge filter 94 is rotatably biased such that circumferential ramp 188a is captured between tab 222a and sloped member 224a while circumferential ramp 188b is simultaneously captured between tab 222b and sloped member 224b. Further rotation of crossflow cartridge filter 94 causes approximation of the crossflow cartridge filter 94 and the manifold assembly 92 such that connector projection 238 is fully inserted into central throughbore 148. Ultimately, the first pair of O-ring seals 202a, 202b create a fluid tight seal between connector projection 238 and central throughbore 148 to prevent water leakage. As connector projection 238 is fully inserted into central throughbore 148, either arcuate interface ramp 182a or 182b contacts the spring loaded valve 200. As crossflow cartridge filter 94 is rotated, arcuate interface ramp 182a or 182b causes spring loaded valve 200 to compress such that the spring loaded valve 200 is lifted from the valve seat 251. As spring loaded valve 200 is lifted from valve seat 251, feed water can begin to flow into the manifold assembly 92.

Once the crossflow filtration assembly 90 is assembled, feed water can begin to flow into the manifold assembly 92 through the supply tube 96. The feed water flows past the spring loaded valve 200 within the manifold feed channel 252 and enters the crossflow cartridge filter 94 through the supply throughbores 170. The feed water enters the crossflow filtration element 110 such that some water is directed through the membrane media 130. As the water travels the length of crossflow filtration element 110, the water volume decreases while the number of contaminants present within the water flow increases. At the end of the crossflow filtration element 100 nearest the closed end 118, the concentrated feed water flows from the crossflow filtration element 110 to form a concentrate stream having a high concentration of contaminants. At the same time, purified water that has passed through the membrane media 130 is collected within the interior permeate tube 132 to form a permeate stream, essentially free of contaminants.

The concentrate stream flows between the crossflow filtration element 110 and the inner wall 124. By directing the concentrate stream in the gap between the crossflow filtration element 110 and the inner wall 124, the potential for deadspots or regions of stagnant water is eliminated. By eliminating deadspots, the potential for biological growth and contamination within the crossflow filtration element 110 is minimized. The concentrate stream enters the circumferential concentrate bore 174 whereby the concentrate stream flows into the concentrate inlet bore 250. O-ring seals 204a, 204b prevent the concentrate stream from contaminating either the feed stream or the permeate stream. From the concentrate inlet bore 250, the concentrate stream is directed through the manifold concentrate channel 254 and to drain through the concentrate tube 98. At various points, either within the manifold assembly 92 or the crossflow cartridge filter 94, a restriction can be placed within the concentrate flow stream to backpressure the concentrate stream such that the volume of the permeate stream can be increased or decreased. For example, this restriction can take the form of a fixed or adjustable orifice located in first portion 174a, or a valve within the manifold assembly 92. The restriction is typically adjusted based on the water quality of the feed supply. For a high quality feed supply, the volume of the permeate stream can be increased as opposed to a feed water supply of a lower quality. For example, where the feed supply is of a poor quality, the recovery can be set at 50% wherein half of the incoming feed supply is filtered to become the permeate stream. Where the feed supply is of a high quality, the recovery can be set as high at 90% wherein the flow rate of the permeate stream is 90% of the flow rate of the feed supply.

The purified permeate stream is collected within the interior permeate tube 132 whereby it flows through the central throughbore 148 and into the permeate throughbore 240. Once in the permeate throughbore 240, the permeate stream flows through the manifold permeate channel 256 whereby the permeate stream is directed to points of use by the permeate tube 100. In an embodiment, permeate tube 100 may deliver the permeate stream to a pressurized permeate tank for subsequent distribution to points of use. In the case of a pressurized permeate tank, the manifold assembly 92 could include a checkvalve to prevent any backflow of permeate from the pressurized permeate tank when the crossflow cartridge filter 94 is removed from the manifold assembly 92.

Figure 19:
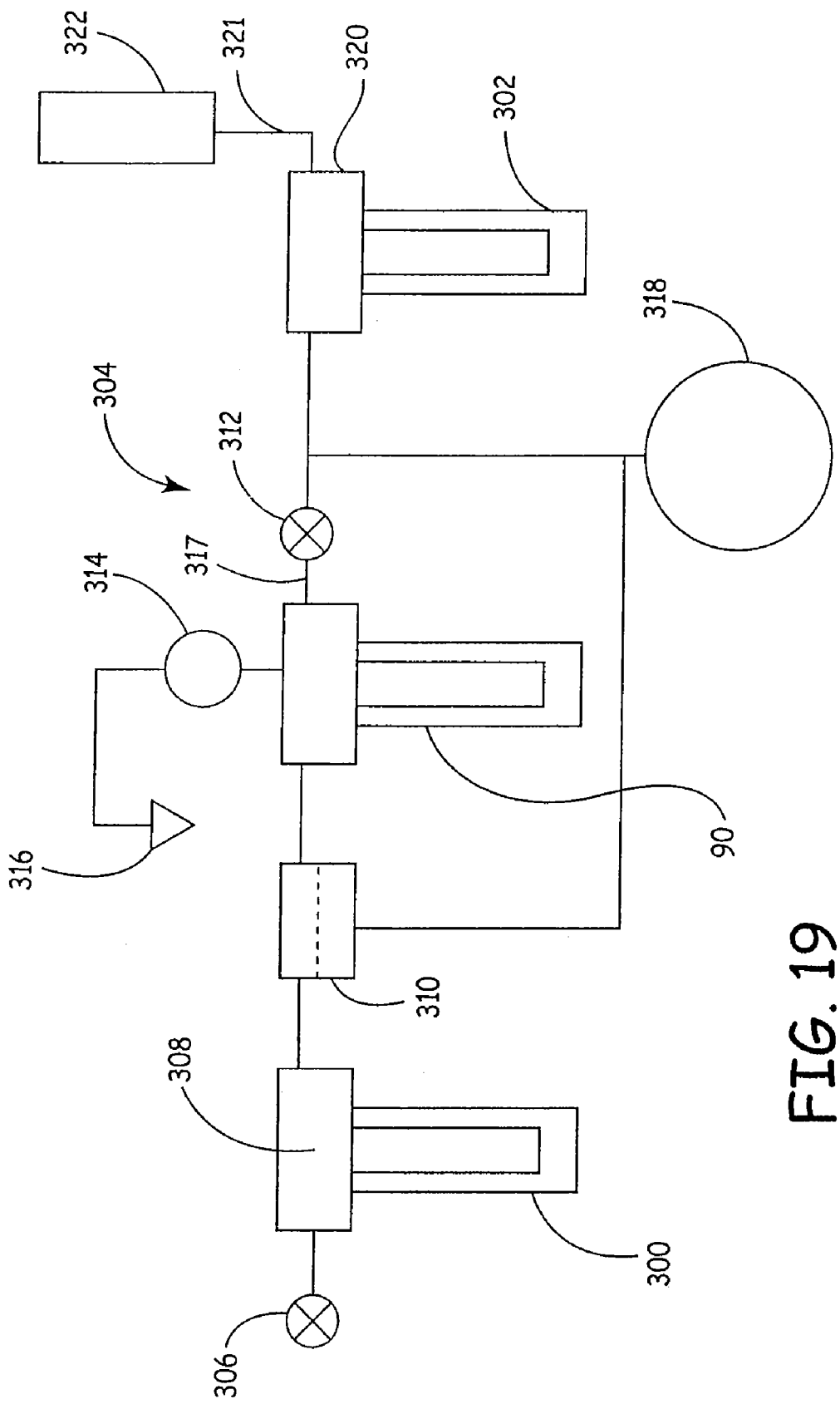
FIG. 19 is a schematic diagram of a water treatment system including a crossflow filtration assembly.

As illustrated in FIG. 19, crossflow filtration assembly 90 can be used in conjunction with a pretreatment filter 300 and a posttreatment filter 302 to form a water treatment system 304. As illustrated, water treatment system 304 can further comprise a feed inlet 306, a pretreatment manifold 308, a shutoff valve 310, a checkvalve 312, a flow restrictor 314, a drain 316, a permeate outlet 317, a storage tank 318, a posttreatment manifold 320, distribution stream 321 and a distribution control 322. The water treatment system 304 can be selectively configured, through the use of various pretreatment filters 300 and posttreatment filters 302 to provide a desired filtered water quality based upon the available feed water quality. For instance, pretreatment filter 300 can include a filter media to remove particulate matter, chlorine, chloramines, organics or hardness. Likewise, posttreatment filter 302 can include filter media to remove any remaining dissolved solids, chlorine, organics and biological material or to removed undesirable taste and/or odor associated with water stored in storage tank 318. Furthermore, pretreatment filter 308 can be configured to increase the permeate recovery of the crossflow filtration assembly 90 such that the flow rate to drain 316 is reduced. The flow restrictor can be used to alter the performance of the filtration medium. In particular, a more restricting flow restrictor can be used to lower the ratio of concentrate flow to permeate flow, while a less restricting flow restrictor increases the ratio of concentrate flow to permeate flow.

Figure 20:
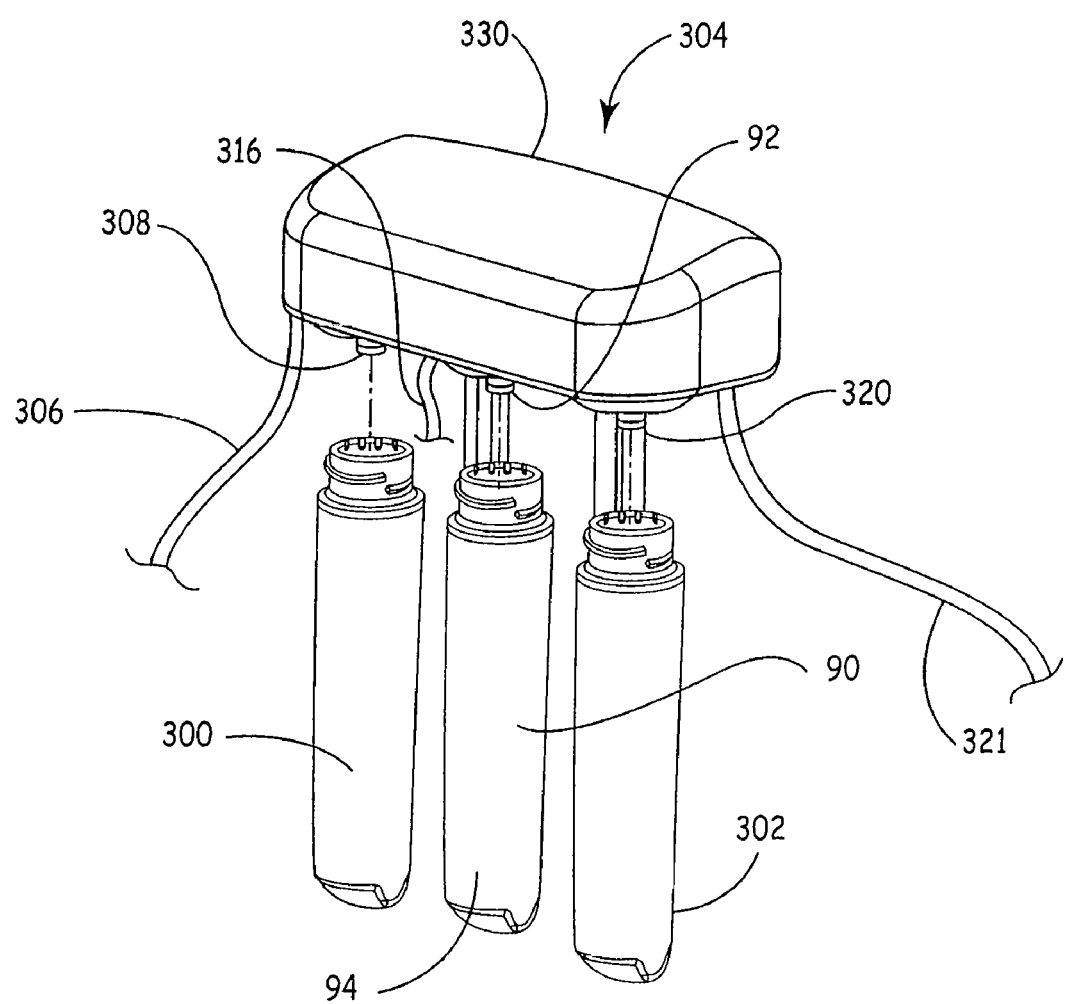
FIG. 20 is an exploded, perspective view of an embodiment of a water treatment system.

In one alternative embodiment of water treatment system 304 illustrated in FIG. 20, crossflow filtration assembly 90, pretreatment filter 300, posttreatment filter 302, feed inlet 306, pretreatment manifold 308, shutoff valve 310, checkvalve 312, flow restrictor 314, drain 316, posttreatment manifold 320 and distribution stream 321 can be incorporated into a unitary manifold assembly 330. Both pretreatment filter 300 and pretreatment manifold 308 as well as posttreatment filter 302 and posttreatment manifold 320 can make use of quick connect filter and manifold assembly designs having one inlet and one outlet, for example as disclosed in U.S. patent application Ser. Nos. 09/618,686, now U.S. Pat. No. 6,953,526; 10/196,340, now abandoned; 10/202,290, now abandoned; and 10/406,637, now U.S. Pat. No. 7,147,772.

Although various embodiments of the present invention have been disclosed here for purposes of illustration, it should be understood that a variety of changes, modifications and substitutions might be incorporated without departing from either the spirit or scope of the present invention.

What is claimed is:

1. A crossflow cartridge filter comprising
a filter housing,
a crossflow filtration element, and
a filter cap, wherein the filter cap defines at least one feed throughbore, at least one permeate throughbore, and at least one concentrate bore, each respectively in fluid communication with a feed water flow circuit, a permeate flow circuit and a concentrate flow circuit passing within the cartridge filter;
wherein the filter cap is configured to sealingly attach to a connecting member on a compatible manifold assembly, wherein the connecting member comprises a feed outlet bore, a permeate throughbore, and a concentrate inlet bore, each complementary to a corresponding bore on the filter cap;
wherein respective fluid tight seals are maintained by at least one permeate o-ring, at least one feed o-ring, and a least one concentrate o-ring;
wherein a permeate stream is isolated from a feed stream by the at least one permeate o-ring, the feed stream is isolated from the permeate stream and a concentrate stream between the at least one permeate o-ring and the at least one feed o-ring, and the concentrate stream is isolated from the feed stream between the at least one feed o-ring and the at least one concentrate o-ring;
wherein the filter cap comprises a substantially cylindrical cross-section and a longitudinal axis, wherein the feed and permeate throughbores are oriented substantially parallel to the longitudinal axis, and wherein an outlet portion of the concentrate bore is oriented substantially perpendicular to the longitudinal axis and opens radially, inwardly toward said axis.

2. The crossflow cartridge filter of claim 1 further comprising a flow director disposed between the crossflow filtration element and the filter cap.

3. The crossflow cartridge filter of claim 2 wherein the flow director comprises:
a media end;
a cap end;
a central throughbore; and
a plurality of perimeter throughbores isolated from the central throughbore by an interior wall.

4. The crossflow cartridge filter of claim 3 wherein, when sealingly attached to the compatible manifold assembly, the at least one permeate o-ring seals against the central throughbore.

5. The crossflow cartridge filter of claim 3 wherein the central throughbore is in fluid communication with the permeate throughbore.

6. The crossflow cartridge filter of claim 3 wherein the plurality of perimeter throughbores are in fluid communication with the feed throughbore.

7. The crossflow cartridge filter of claim 3 wherein the flow director further comprises an exterior wall isolating the plurality of perimeter throughbores from the concentrate stream.

8. The crossflow cartridge filter of claim 2 wherein the flow director is integral with the filter cap.

9. The crossflow cartridge filter of claim 1 wherein the filter cap comprises an exterior surface comprising a fastening element for attaching to a connecting member on a compatible manifold assembly.

10. The crossflow cartridge filter of claim 9 wherein the fastening element comprises a pair of circumferential ramps.

11. The crossflow cartridge filter of claim 1 wherein the filter cap comprises an interconnecting cavity comprising a perimeter wall.

12. The crossflow cartridge filter of claim 11 wherein the perimeter wall comprises the concentrate bore.

13. The crossflow cartridge filter of claim 12 wherein, when sealingly attached to the compatible manifold assembly, the at least one concentrate o-ring seals against the perimeter wall.

14. The crossflow cartridge filter of claim 13 wherein, when sealingly attached to the compatible manifold assembly, the at least one feed o-ring seals against the perimeter wall.

15. The crossflow cartridge filter of claim 11 further comprising a plurality of notches along the perimeter wall.

16. The crossflow cartridge filter of claim 1 wherein the concentrate bore comprises an inlet portion and said outlet portion.

17. The crossflow cartridge filter of claim 16 wherein the outlet portion comprises a restriction to backpressure the concentrate stream.

18. The crossflow cartridge filter of claim 17 wherein the restriction comprises an orifice.

19. The crossflow cartridge filter of claim 18 wherein the restriction further comprises an orifice filter.

20. The crossflow cartridge filter of claim 16 wherein the inlet portion is oriented substantially parallel to the longitudinal axis.

* * * * *